US006889776B2

(12) United States Patent
Cheung

(10) Patent No.: US 6,889,776 B2
(45) Date of Patent: May 10, 2005

(54) AIRBORNE WATER DIFFUSER

(75) Inventor: Kwok Pun Cheung, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 178 days.

(21) Appl. No.: 09/922,871

(22) Filed: Aug. 6, 2001

(65) Prior Publication Data
US 2002/0079379 A1 Jun. 27, 2002

Related U.S. Application Data
(60) Provisional application No. 60/223,754, filed on Aug. 8, 2000.

(51) Int. Cl.$^7$ ............................................. A62C 25/00
(52) U.S. Cl. ........................... 169/53; 169/51; 239/171; 244/136; 294/68.2
(58) Field of Search ............................... 239/171, 726; 169/53, 16, 51, 52, 70, 30, 34; 244/136, 129.2; 294/68.2, 68.21, 68.22

(56) References Cited

U.S. PATENT DOCUMENTS

| | | | | |
|---|---|---|---|---|
| 1,609,762 A | * | 12/1926 | Morgan | 169/53 |
| 2,779,421 A | * | 1/1957 | Rust | 169/53 |
| 3,273,651 A | * | 9/1966 | Andrews | 169/53 |
| 3,428,276 A | * | 2/1969 | Hubbard | 169/53 |
| 3,485,302 A | * | 12/1969 | Thorpe | 239/171 |
| 3,580,339 A | * | 5/1971 | Nance | 169/53 |
| 3,661,211 A | | 5/1972 | Powers | |
| 3,688,952 A | * | 9/1972 | Barlow et al. | 239/171 |
| 3,710,868 A | | 1/1973 | Chadwick | |
| 3,759,330 A | * | 9/1973 | Raine et al. | 169/16 |
| 3,897,829 A | | 8/1975 | Eason | |
| 3,901,467 A | | 8/1975 | Hawkshaw | |
| 4,090,567 A | | 5/1978 | Tomlinson | |
| 4,180,224 A | | 12/1979 | Ryle, Jr. | |
| 4,437,630 A | | 3/1984 | Jefferies | |
| 4,474,245 A | | 10/1984 | Arney | |
| 4,576,237 A | | 3/1986 | Arney | |
| 4,671,472 A | | 6/1987 | Hawkshaw | |
| 4,881,601 A | | 11/1989 | Smith | |
| 5,320,185 A | | 6/1994 | Foy et al. | |
| 5,549,259 A | | 8/1996 | Herlik | |
| 5,560,429 A | | 10/1996 | Needham | |
| 5,829,809 A | | 11/1998 | Arney et al. | |

FOREIGN PATENT DOCUMENTS

| | | |
|---|---|---|
| FR | 2665874 | 2/1992 |
| GB | 2094668 | 9/1982 |
| WO | 0228708 | 4/2002 |

OTHER PUBLICATIONS

PCT International Search Report dated Jun. 20, 2002 (3 pgs.).

* cited by examiner

Primary Examiner—Dinh Q. Nguyen
(74) Attorney, Agent, or Firm—Jones Day

(57) ABSTRACT

An apparatus is for use with a container of liquid that is suspended from an aircraft flying over a ground target area. The container has an outlet through which the liquid is dropped from the container. The apparatus includes a diffuser configured to diffuse the liquid exiting the container outlet horizontally outward beyond the container into the air above the ground target area, whereby the liquid is diffused over a correspondingly wide area. The liquid can be fire extinguishing liquid, and the ground target area can be a forest fire.

3 Claims, 10 Drawing Sheets

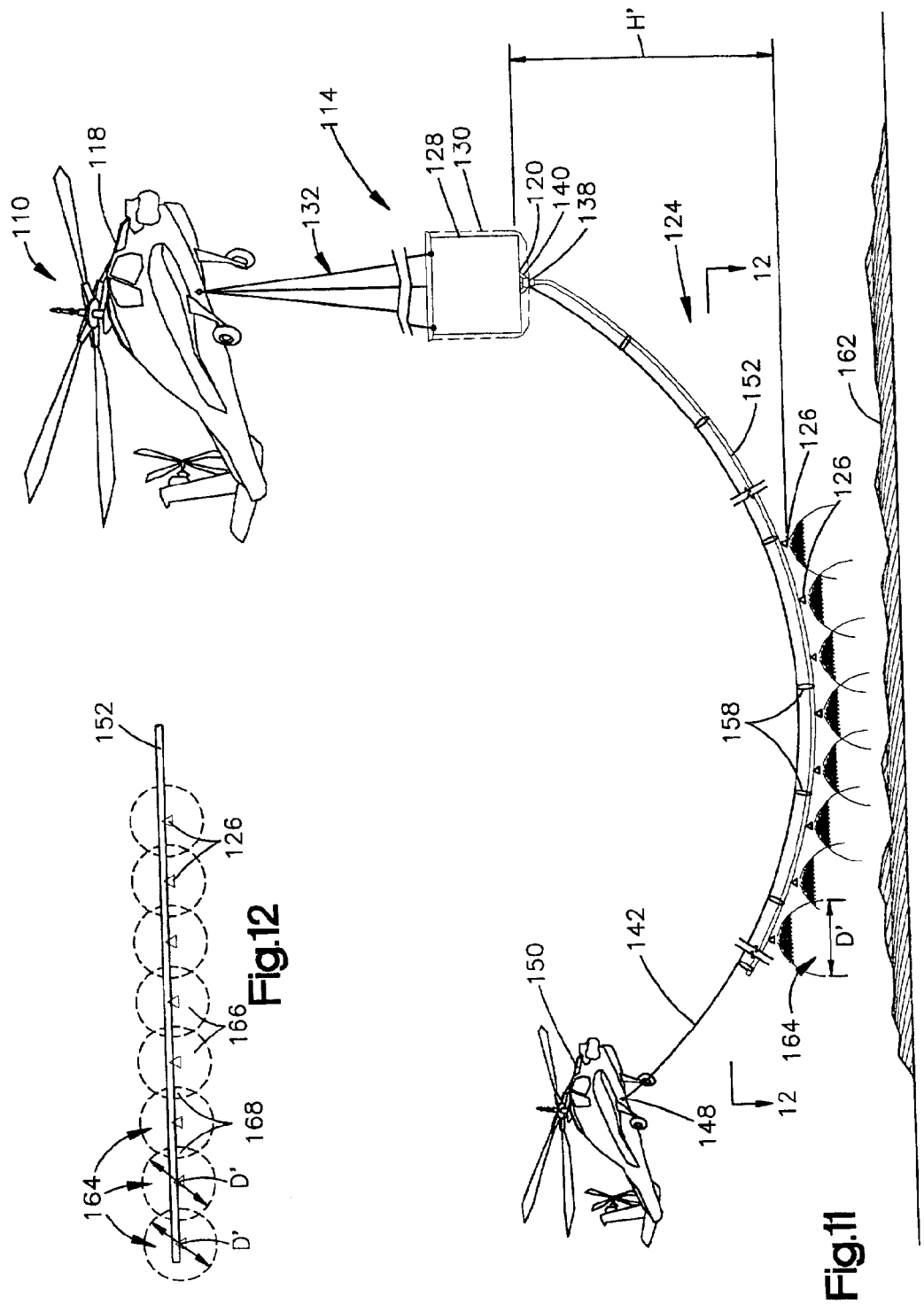

US 6,889,776 B2

AIRBORNE WATER DIFFUSER

This application claims the benefit of U.S. Provisional Application No. 60/223,754, filed Aug. 8, 2000, and incorporates the Provisional Application by reference.

FIELD OF THE INVENTION

The present invention relates to airborne water sprinkling systems.

BACKGROUND

An airborne water sprinkling system is used to transport water to fight fires favoring aerial discharge of water based fire fighting agents such as a forest fire and to discharge water based fire fighting agents such as the water over the fire to extinguish the fire. The water is held in a container that is transported by an aircraft.

SUMMARY OF THE INVENTION

The present invention provides an apparatus for use with a container of liquid that is suspended from an aircraft flying over a ground target area. The container has an outlet through which the liquid is dropped from the container. The apparatus includes a diffuser configured to diffuse the liquid exiting the container outlet horizontally outward beyond the container into the air above the ground target area, whereby the liquid is diffused over a correspondingly wide area.

In a preferred embodiment, the liquid is fire extinguishing liquid, and the ground target area is a forest fire. A diffuser inlet receives the liquid, and diffuser outlets discharge the liquid into the air. The diffuser outlets are spaced horizontally from each other. A manifold of the diffuser communicates the diffuser inlet with the diffuser outlets. The manifold has rigid hydraulic lines extending from the diffuser inlet. Flexible hydraulic lines of the manifold extend from the rigid lines to the diffuser outlets. Buoyant structures are configured to maintain the diffuser outlets above the container when the container is submerged in a body of liquid. The diffuser is configured to diffuse the liquid by allowing the liquid to fall from the diffuser solely through the force of gravity.

The diffuser can further have a hydraulic line. A first end of the hydraulic line is configured to be connected to the container outlet. A second end of the hydraulic line is configured to be connected to a second aircraft. The diffuser outlets are spaced apart along the hydraulic line.

BRIEF DESCRIPTION OF THE DRAWINGS

FIG. 11 is a view similar to FIG. 9, showing the sprinkling system in a third mode of operation; and FIG. 12 is a top view taken on line 12—12 of FIG. 11.

DESCRIPTION

Figure 1:
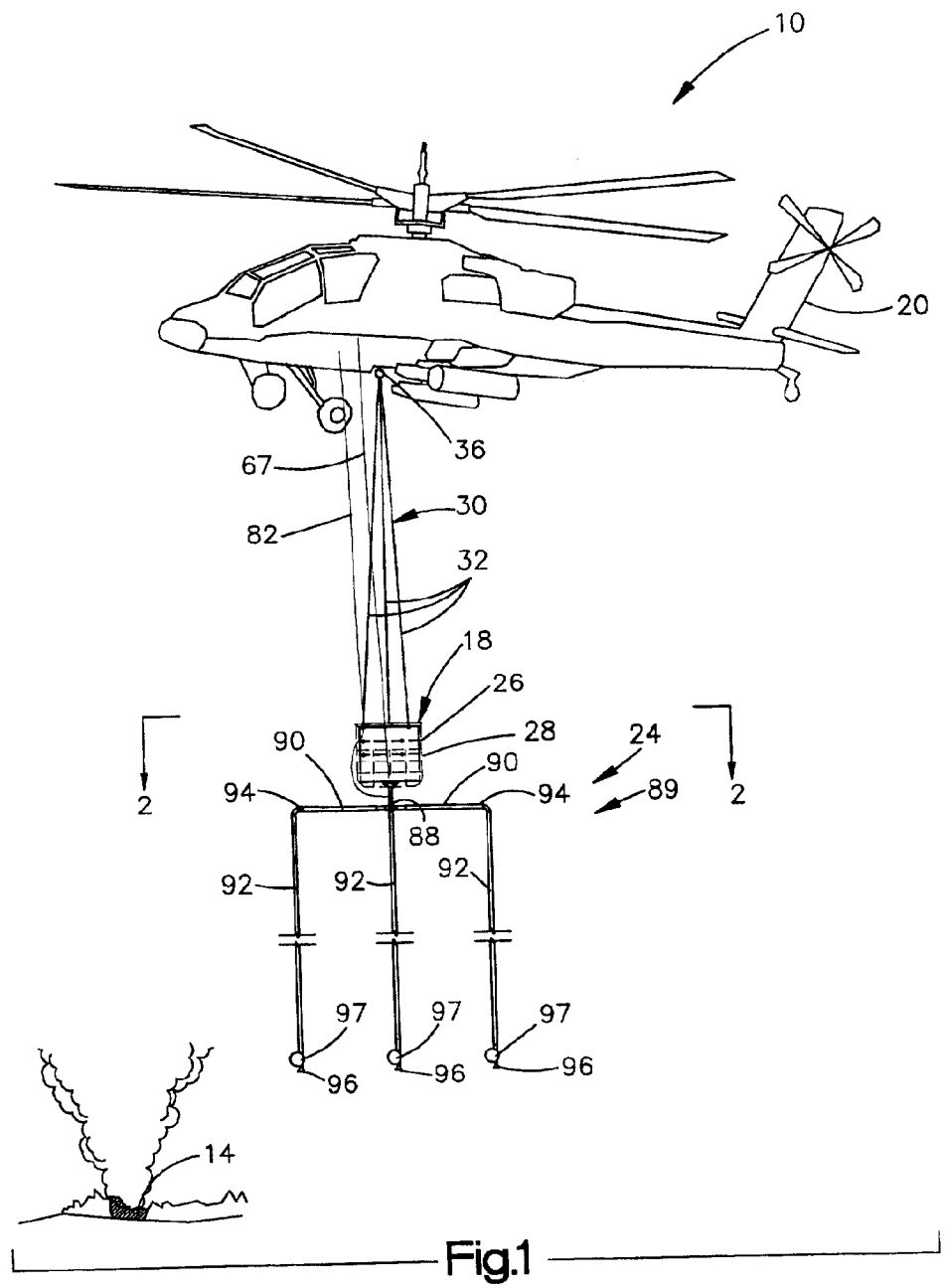
FIG. 1 is a perspective view of a sprinkling system comprising a first embodiment of the present invention, showing the sprinkling system in one mode of operation.
Figure 2:
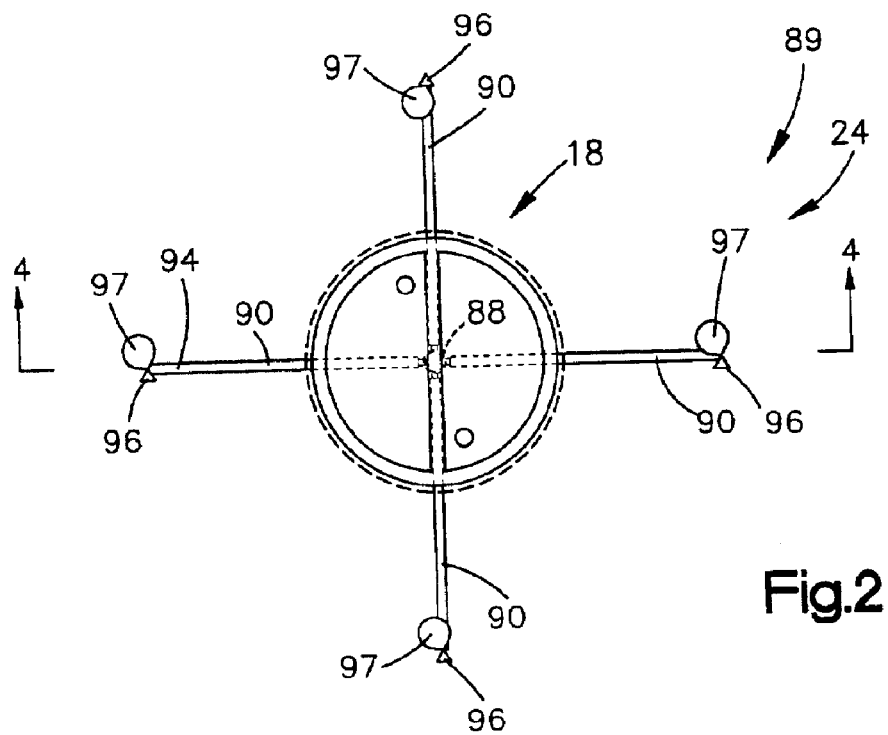
FIG. 2 is a top view taken on line 2—2 shown in FIG. 1.

An example of a preferred embodiment of the present invention is shown in FIGS. 1 and 2. The preferred embodiment is an airborne sprinkling system 10 that is used to transport water to a forest fire 14 and to discharge the water over the fire 14. The water is initially held in a container 18 that is transported aloft by an aircraft, such as a helicopter 20. A diffuser 24 at the bottom of the container 18 diffuses the water horizontally outward from the container 18 into the air, to drop the water onto the fire 14 to extinguish it.

The container 18 is in the form of a bucket 26 surrounded by a wire net 28, as shown in FIG. 1. The bucket 26 is suspended from the helicopter 20 by a suspension structure 30. The suspension structure 30 includes three suspension wires 32. An upper end of each suspension wire 32 is attached to the helicopter 20 by a hook 36 affixed to the helicopter 20. A lower end of each suspension wire 32 is attached to the upper end of the bucket 26 and to the upper end of the net 28.

Figure 3:
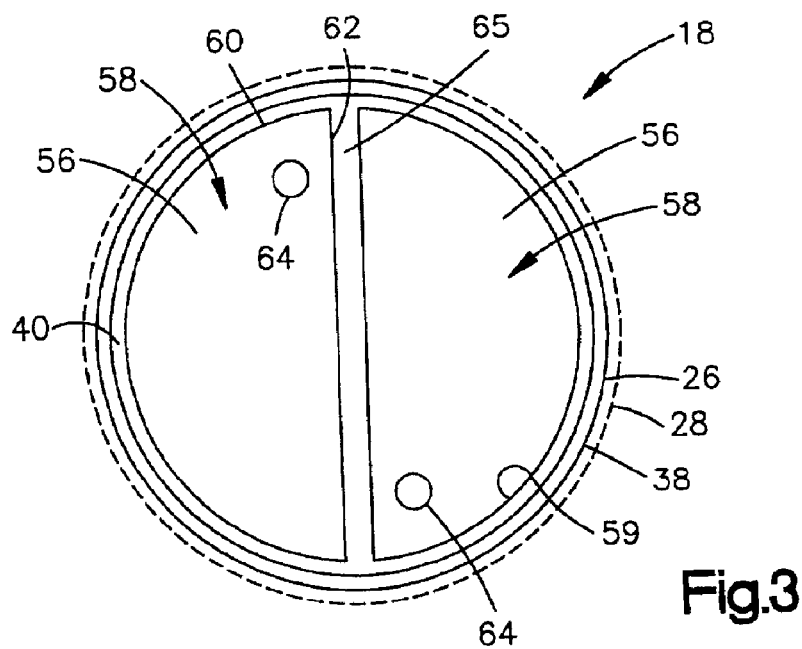
FIG. 3 is an expanded top view of a part shown in FIG. 2.
Figure 4:
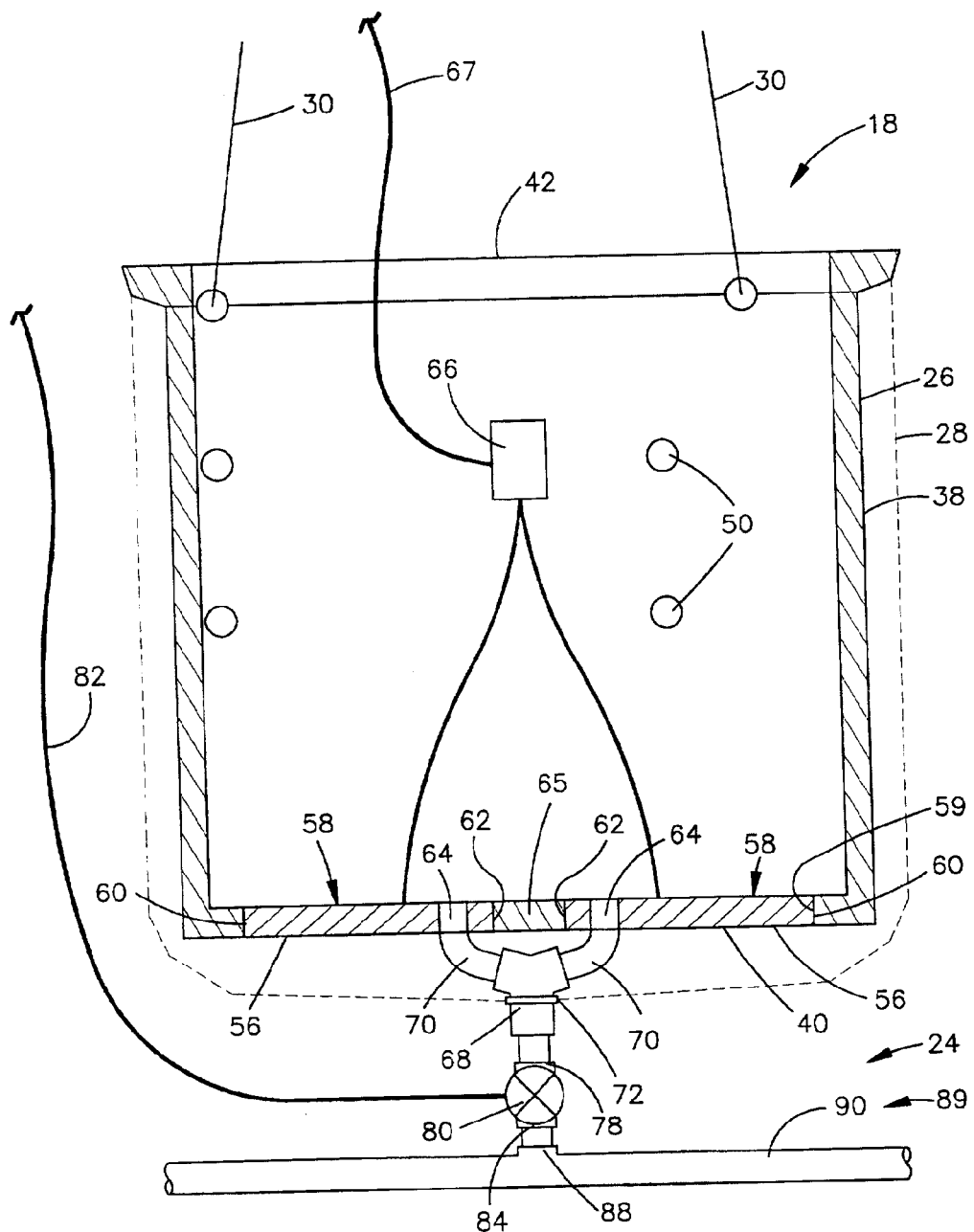
FIG. 4 is a sectional view taken on line 4—4 of FIG. 2, showing parts in one configuration.
Figure 5:
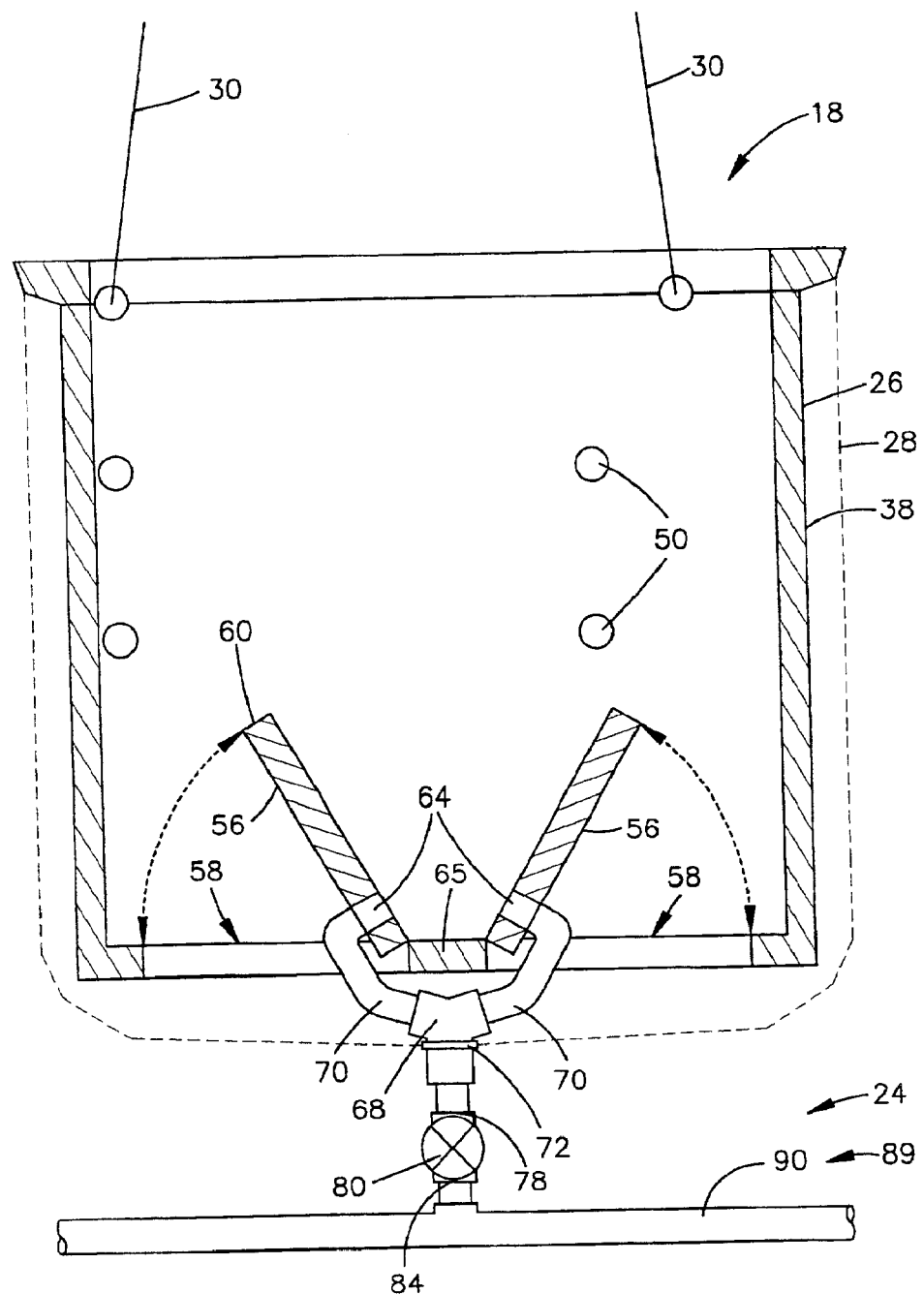
FIG. 5 is a view similar to FIG. 4, showing the parts in a second configuration.

As shown in FIGS. 3 and 4, the bucket 26 has a cylindrical side wall 38, a flat bottom wall 40 and an open top 42. The side wall 38 has orifices 50 located at various heights from the bottom wall 40. Some or all of the orifices 50 can be plugged to pre-select a water level within the container 18, as explained below. The bottom wall 40 has two similar semicircular panel doors 56 that are shaped to fit closely within corresponding semicircular door openings 58 defined by apertures 59 in the bottom wall 40. Each door 56 has an arcuate edge 60, a straight edge 62, and an orifice 64 serving as a container outlet. The straight edges 62 are hinged to a rectangular central strip 65 of the bottom wall 40. The panel doors 56 can be pivoted about the central strip 65 between a closed position and an open position. In the closed position, shown in FIGS. 3 and 4, the doors 56 are received closely within the respective door openings 58. In the open position, shown in FIG. 5, the doors 56 are tilted upward out of the door openings 58.

A motor 66, shown schematically in FIG. 4, can be attached to the panel doors 56 to open and close the doors 56. The motor 66 can be controlled through an electrical line 67 by a switch (not shown) within the cockpit of the helicopter 20 (FIG. 1).

As shown in FIG. 4, the two container outlets 64 are connected to a 3-port connector 68 by two flexible hydraulic lines 70. The connector 68 is retained in an opening 72 in the bottom of the net 28. The connector 68 is connected to an inlet 78 of an electrically-controlled outlet valve 80. The valve 80 is electrically connected by an electrical line 82 to another switch (not shown) within the cockpit. Using the switch, an operator can cause the valve 80 to adopt an open condition or a closed condition. An outlet 84 of the valve 80 is connected to an inlet 88 of the diffuser 24.

As shown in FIGS. 1 and 2, the diffuser 24 has a manifold 89 that includes four rigid hydraulic lines 90 that extend radially outward from the diffuser inlet 88 and, further, horizontally outward beyond the container 18. The manifold 89 also includes four flexible hydraulic lines 92 that extend from radially-outer ends 94 of the four rigid lines 90 to four respective diffuser outlets 96. The outlets 96 discharge water from the flexible lines 92 into the air. Four air-filled balloons 97 are attached to distal ends of the four flexible lines 92 near the diffuser outlets 96.

Figure 6:
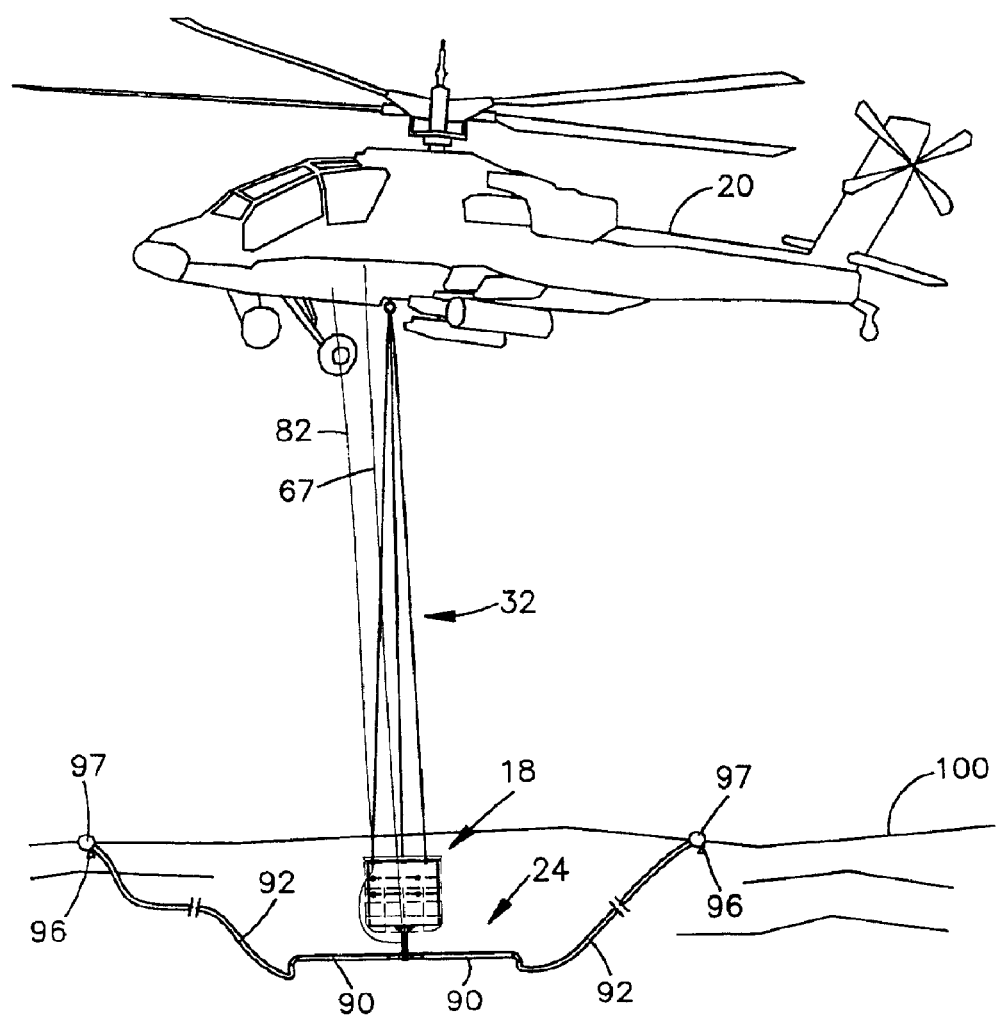
FIG. 6 is a view similar to FIG. 1, showing the sprinkling system in a second mode of operation.

In operation, the container 18, with the diffuser 24 attached, is carried aloft by the helicopter 20. When carried aloft, the flexible lines 92 extend downward due to gravity. Because the flexible lines 92 extend to the diffuser outlets 96, as described above with reference to FIG. 1, the diffuser outlets 96 are thus spaced vertically downward from the diffuser inlet 88, as shown in FIG. 1. The container 18 is filled with water from an open water source, such as a lake 100, as shown in FIG. 6. To fill the container 18, the helicopter 20 gradually descends, thereby lowering the container 18 into the lake 100. Water from the lake 100 forces the panel doors 56 (FIG. 5) open and enters the container 18. Opening of the panel doors 56 can be assisted by the motor 66 (FIG. 4). The container 18 is gradually submerged in the lake 100 as it fills with water. Although the rigid lines 90 are totally submerged, the diffuser outlets 96 remain near the surface of the lake 100 due to buoyancy of the balloons 97.

Next, the helicopter 20 ascends, raising the container 18 and the diffuser 24 out of the lake 100. As shown in FIG. 4, the panel doors 56 of the container 18 automatically close under the force of gravity. Closing of the panel doors 56 can be assisted by the motor 66. With the panel doors 56 closed and the valve 80 in a closed condition, the container 18 is substantially watertight. Water gradually spills out of any of the orifices 50 in the side wall 38 that are unplugged until the water level within the container 18 is lowered to the level of the lowest unplugged orifice 50. Thus, the water level in the container 18 can be pre-selected by plugging only those orifices 50 that are below a desired water level.

Figure 7:
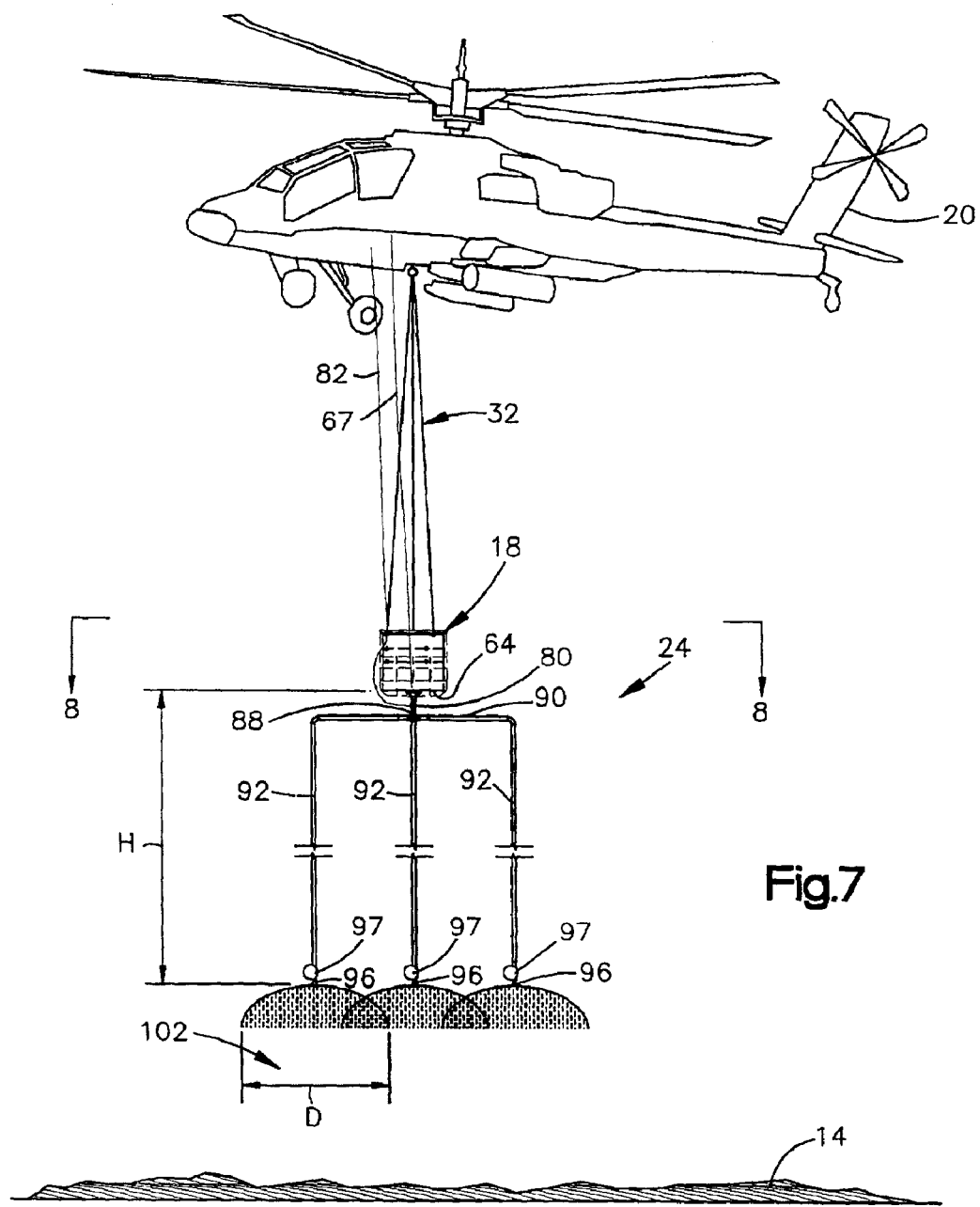
FIG. 7 is a view similar to FIG. 1, showing the sprinkling system in a third mode of operation.

Subsequently, the helicopter 20 transports the container 18 and the diffuser 24 to the forest fire 14 to discharge the water over the fire 14, as shown in FIG. 1. As shown in FIG. 7, while the helicopter 20 is traveling over or hovering over the forest fire 14, the valve 80 is switched to the open condition. With the container 18 being vented at the open top 40, and also at the orifices 50, this enables water to pass from the container 18 through the container outlets 64 into the diffuser 24, driven only by the force of gravity. The water is forced out of the diffuser outlets 96 into the air by a hydraulic head pressure, corresponding to the height H of the container 18 relative to the diffuser outlets 96.

Figure 8:
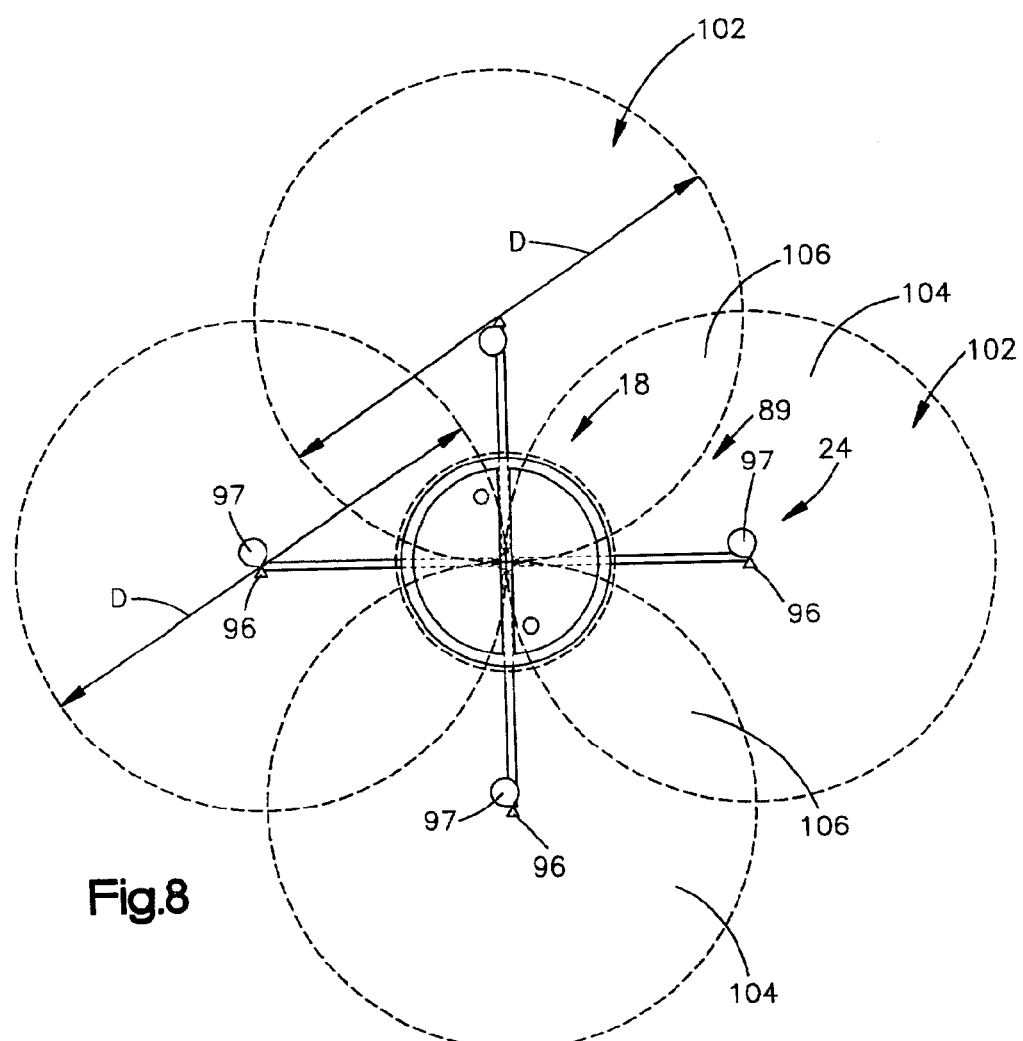
FIG. 8 is a top view taken on line 8—8 of FIG. 7.

Each diffuser outlet 96 directs the water radially outward from the outlet 96 in all directions under the force of the hydraulic head. As water falls from each diffuser outlet 96, it spreads over a circular area 102 of diameter D, as shown in FIG. 8. This yields a water distribution pattern defined by lower-density areas 104 and higher-density areas 106. Each lower-density area 104 receives water from only one of the diffuser outlets 96, whereas each higher-density area 106 receives water from two of the diffuser outlets 96. The higher-density areas 106 thus receive about twice the water density as the lower-density areas 104. The rate of water discharge from each diffuser outlet 96 and the diameter D are determined by the structural configuration of the diffuser outlets 96 and the dimensions of the flexible lines 92 (FIG. 7).

In this sprinkling operation, the water is diffused in two manners. Specifically, the water is distributed by the manifold 89 to the outlets 96 that are located horizontally outward from the container 18 and from each other. Additionally, each outlet 96 individually diffuses the water by spraying the droplets radially outward.

As explained above with reference to FIG. 4, the outlet valve 80 is controlled by a switch within the cockpit through the electrical line 82. Alternative, the valve 80 can be controlled by a wireless remote control system, thereby obviating the electrical line 82. In that case, the valve 80 would be powered by a battery affixed to the container 18. The valve 80 would be electrically connected to a remote control receiver, and a corresponding transmitter would be located in the cockpit.

Figure 9:
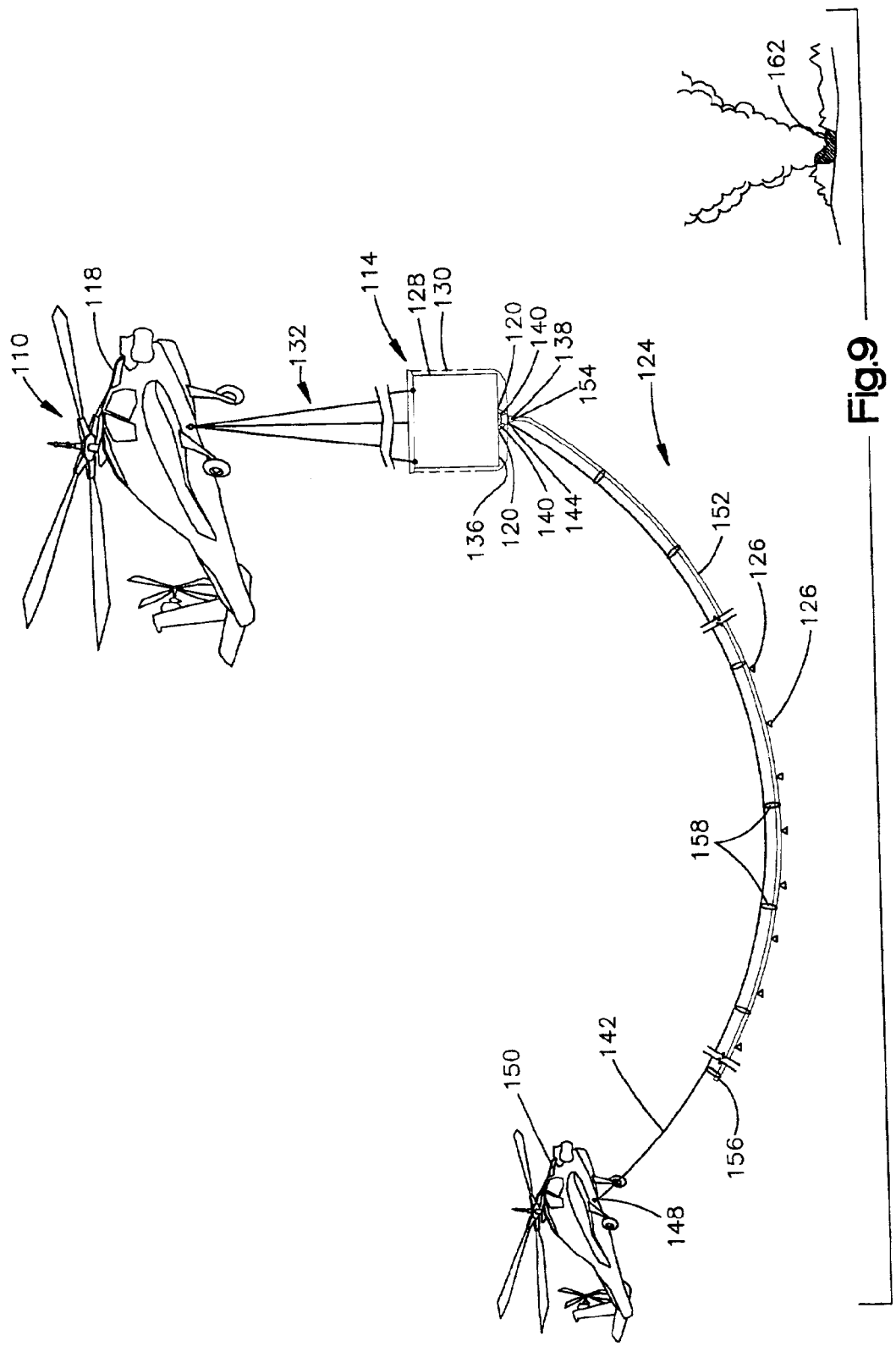
FIG. 9 is a perspective view of a sprinkling system comprising a second embodiment of the present invention, showing the sprinkling system in one mode of operation.

An example of a second embodiment of the invention is shown in FIG. 9. A sprinkling system 110 of the second embodiment has features that are similar to those of the sprinkling system 10 of the first embodiment (FIG. 1). As in the first embodiment, water in the second embodiment is held in a container 114 that is suspended from a helicopter 118. Also, as in the first embodiment, a diffuser 124 diffuses water horizontally outward from the container 114, through diffuser outlets 126, into the air. However, in contrast to the first embodiment, the diffuser outlets 126 are arranged as a string of diffusers extending horizontally in only a single direction. Also, in contrast to the first embodiment, the diffuser 124 has no outlet valve, and the weight of the diffuser 124 is borne jointly by two helicopters.

The container 114 of the second embodiment has the same structure as described above with reference to the first embodiment (FIGS. 3 and 4). Specifically, the container 114 includes a bucket 128 within a net 130, both suspended from the first helicopter 118 by a suspension structure 132. Two container outlets 120 in a bottom wall 136 of the bucket 128 are connected by two flexible hydraulic lines 140 to a 3-port connector 138. The connector 138, in turn, is connected to the diffuser 124. The diffuser 124 includes a suspension wire 142 having a first end 144 attached to the bottom of the net 130 and a second end 148 attached to a second helicopter 150.

The diffuser also includes a flexible hydraulic line 152 having an inlet end 154 and an opposite closed end 156. The inlet end 154 is connected to the connector 138. The flexible line 152 is suspended along its length from the suspension wire 142 by a series of hooks 158 spaced apart along the length of the suspension wire 142. The closed end 156 of the flexible line 152 is thus indirectly connected to the second helicopter 150 by means of the suspension wire 142. The weight of the diffuser 124 is consequently borne by both helicopters 118 and 150. The diffuser outlets 126 are spaced apart along the length of the flexible line 152. These outlets 126 are similar to the diffuser outlets 96 of the first embodiment (FIG. 1).

Figure 10:
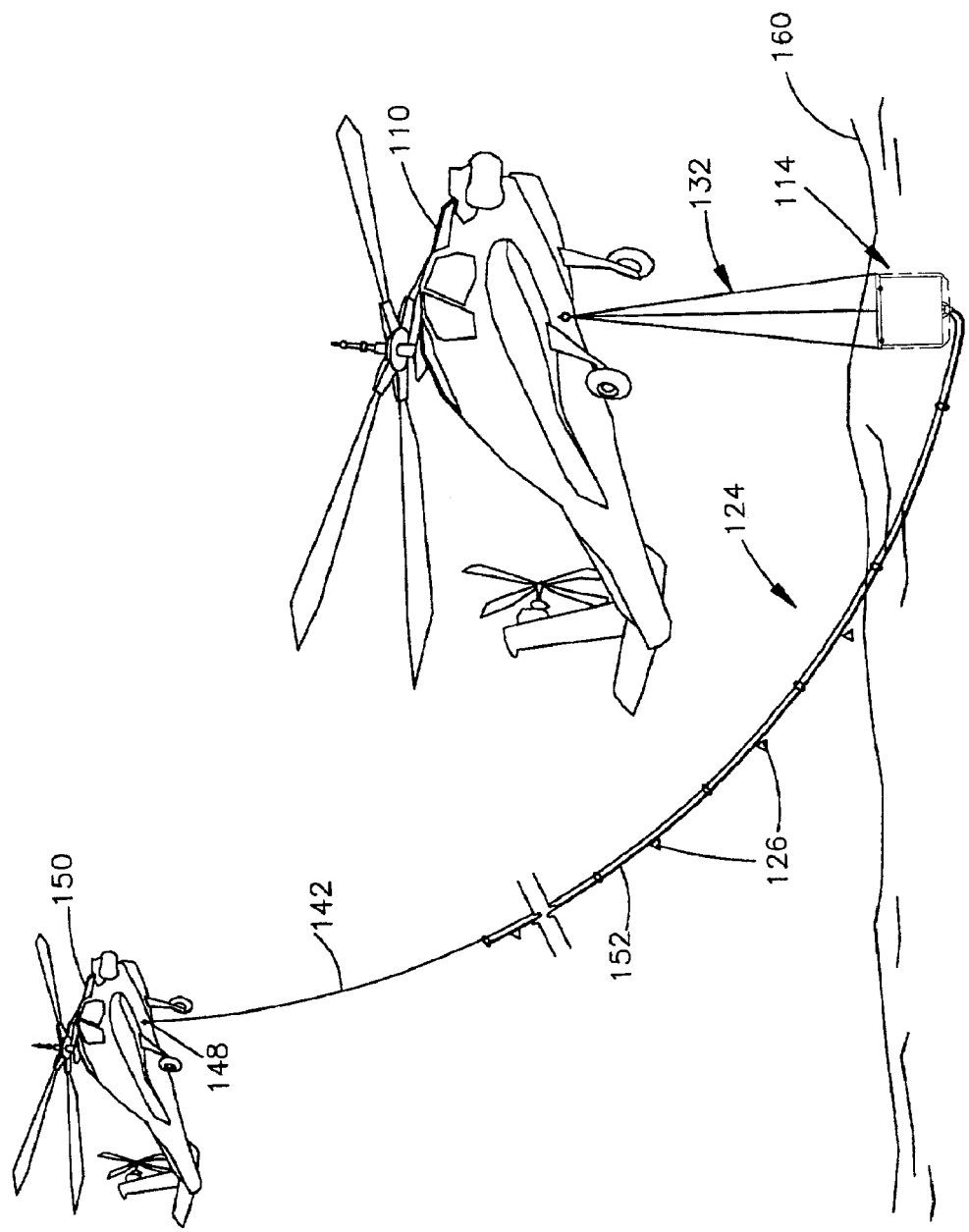
FIG. 10 is a view similar to FIG. 9, showing the sprinkling system in a second mode of operation.

In operation, the container 114, with the diffuser 124 attached, is carried aloft by the helicopters 118 and 150, as shown in FIG. 9. The container 114 is filled with water from a lake 160, as shown in FIG. 10. The helicopters 118 and 150 gradually descend, thereby lowering the container 114 into the lake 160. The container 114 is gradually submerged in the lake 160 as it fills with the water. Next, the helicopters 118 and 150 ascend, raising the container 114 out of the lake 160. Subsequently, as shown in FIG. 9, the helicopters 118 and 150 transport the container 114 and the diffuser 124 to a forest fire 162 to drop the water over the fire 162. Throughout these steps of filling (FIG. 10) and transporting (FIG. 9) the container 114, the altitude of the second helicopter 150 relative to the first helicopter 118 is maintained such that all of the diffuser outlets 126 are above the container 114. This prevents the water from flowing out of the container 114 through the diffuser outlets 126 under the force of gravity.

As shown in FIG. 11, while the helicopters 118 and 150 are traveling over or hovering over the forest fire 162, the altitude of the second helicopter 150 relative to the first helicopter 118 is lowered so that the water flows from the container 114 through the diffuser 124 by the force of gravity. The water is forced out of each diffuser outlet 126 into the air by a hydraulic head pressure corresponding to the height H' of the container 114 relative to the diffuser outlets 126.

The diffuser outlets 126 direct the water radially outward in all directions under the force of the hydraulic head. As the water falls from the diffuser outlets 126, it spreads over circular areas 164 of diameter D', as shown in FIG. 12. This yields a water distribution pattern defined by lower-density areas 166 and higher-density areas 168. Each lower-density area 166 receives water from only one of the diffuser outlets 126, whereas each higher-density area 168 receives water from two of the diffuser outlets 126. The higher-density areas 168 thus receive about twice the water density as the lower-density areas.

In the sprinkling operation described with reference to FIG. 11, the water is diffused in two different manners. First, the water is distributed to the outlets 126 that are located horizontally outward from the container 114 and from each other. Secondly, each outlet 126 diffuses the water by spraying the water radially outward.

While discharging the water over the fire 162, the helicopters 118 and 150 can move side-to-side to broaden the spread of the water over the fire 162. In doing so, the second helicopter 150 optimally moves side-to-side more than the first helicopter 118, because the second helicopter 150 carries a lighter load. This is because the first helicopter 118 bears the weight of the container 114 and the water within the container 114, whereas the second helicopter 150 does not. Because the second helicopter 150 bears a lighter load, it can be rated for lower weight capacity than the first helicopter 118.

Calculations for operating the sprinkling system 10 (FIGS. 1–8) borne by one helicopter, described with reference to the first embodiment, are as follows. For this exemplary scenario, assume that the design discharge water density is 5 liters/m$^2$/minute. Also assume that the effective water density is 3 liters/m$^2$/minute, which is about the density of heavy rain, assumed to be the water density that can reach the fire (This assumption is subject to future test confirmation and adjustment.), allowing say, loss to air of 2 liters/m$^2$/minute of water density.

If each diffuser outlet delivers 60 liter per minute, vertically downwards, horizontal area covered by each sprinkler is 12 m$^2$=(60 liters/minute)/(5 liters/m$^2$/minute)=12 m$^2$ receiving 5 liters/m$^2$/minute water density. Note that since 2 liters/m$^2$/min. is assumed to be lost, 3 liters/m$^2$/minute is the final water density falling on the burning objects and their vicinity. Since $\pi D^2/4$=area of a circle. 12 m$^2$ is the area of a circle of diameter of 3.91 m; i.e. $12=\pi D^2/4$.

For an arrangement of four sprinklers (FIGS. 1, 2, 7 and 8) fire area receiving 3 liters/m$^2$/minute water density equals 4×a m$^2$, and fire area receiving 6 liters/m$^2$/minute water density equals 4×b m$^2$. The duration of time that these areas can continuously receive water from an airborne water sprinkler system having a water container which can effectively discharge 480 liters through the 4 sprinklers equals 2 minutes, equivalent to 120 seconds, calculated as 480 liters/4 sprinklers/60 liters/minute.

Now suppose the fire as sprinkled by water with the densities as described can be paralyzed (i.e. stopped from burning further to other unburnt objects) with 10 seconds of continuous sprinkling water falling on the same object region, then 480 liters water from the airborne water container can paralyze a fire of an area equaling 4(a+b) m$^2$×120 seconds/10 seconds=48(a+b) m$^2$ which is 12 times 4(a+b) m$^2$.

Suppose this area of 48(a+b) m$^2$ effectively covers a burning area of about 12×6.5 m×6.5 m (FIG. 8, by measurement in scale), then the area of fire front that can be paralyzed by one action of discharging 480 liters of water from the airborne water container equals 6.5 m×6.5 m×12= 507 m$^2$. If the fire front is less than 6.5 m, and this length of fire front is effectively fought by the water discharged, the length of fire front that can be paralyzed by one such action equals 507 m$^2$/6.5 m=78 m.

Suppose the fire front is 2 km (i.e. 2,000 m), it will then take 26 such operations to paralyze this fire front, because 2,000 m/78 m equals 25.6.

If it takes two minutes for one helicopter to travel from the fire front to a water source to refill the airborne water container and then travels back to the fire front, then two helicopters each conducting 13 such operations in an overall time period of about 52 minutes (i.e. 52=26×2 minutes) can paralyze a fire front of 2,000 m long.

Now suppose a larger airborne water container that can discharge water of 960 liters is used, then each helicopter operation will take about 6 minutes, (i.e. 6 minutes=2 minutes of traveling and filling water+4 minutes of discharging water) and paralyze 156 m fire front (156 m=2×78 m).

In order to paralyze 2,000 m long fire front, it will take 13 helicopter operations (i.e. 2,000 m/156 m=12.8).

If two helicopters operate alternatively on the fire front, it will take 52 minutes to discharge water to paralyze the fire front (i.e. 52=13×4 minutes). This is the same duration as before. But this will allow 4 minutes for traveling and water filling time for the helicopters. That is the water source can be further away.

In the scenario above, water loss to air depends on the distribution of water drop sizes discharged, air down draft from helicopter, wind direction, fire gas upward movement. Therefore assumed loss of 2 liters/m$^2$/minute may vary.

The arrangement of four diffuser outlets is one way of arranging the diffuser outlets. There are other possible ways of diffuser outlet arrangement for varying the number of diffuser outlets, distance between diffuser outlets and their types, lengths of rigid tube and fixed tube.

If there are additional helicopters fighting the fire from both ends of the length of burning objects, using the invented systems the same fire can be paralyzed in a shorter time.

The above calculations relate to the sprinkling system 10 (FIGS. 1–8) borne by one helicopter. Calculations for operating the sprinkling system 110 (FIGS. 9–12) borne by two helicopters are as follows. For this exemplary scenario, assume that the design discharge water density is 5 liters/m$^2$/minute. Also assume that the effective water density is 3 liters/m$^2$/minute, which is about the density of heavy rain, assumed to be the water density that can reach the fire (This assumption is subject to future test confirmation and adjustment.), allowing say, loss to air of 2 liters/m$^2$/minute of water density.

If each diffuser outlet delivers 60 liters per minute, vertically downwards, horizontal area covered by each diffuser outlet is 12 m$^2$, calculated as (60 liters/minute)/(5 liters/m$^2$/minute)=12 m$^2$ receiving 5 liters/m$^2$/min. water density. Note that since 2 liters/m$^2$/min. is assumed to be lost, 3 liters/m$^2$/minute is the final water density falling on the burning objects and their vicinity. Since $\pi D^2/4$=area of a circle, 12 m$^2$ is the area of a circle of diameter of 3.91 m (i.e. 12=$\pi D^2/4$).

There are various possible arrangement of flexible tubes and diffuser outlets. For an arrangement of eight sprinklers (FIGS. 9–11), the fire area receiving 3 liters/m$^2$/minute water density equals 8a+2b m$^2$, and fire area receiving 6 liters/m$^2$/minute water density equals 7b m$^2$. The time that these areas can continuously receive water from an airborne water container which can effectively discharge 480 liters through the eight sprinklers is 1 minute, equivalent to 60 seconds, calculated as 480 liters/8 sprinklers/60 liters/minute.

Now suppose the fire as sprinkled by water with the densities as described can be paralyzed (i.e. stopped from burning further) with 10 seconds of continuous sprinkling water falling on the same object region, then 480 liters water from the airborne water container can paralyze a fire of an area, calculated as (8a+2b+7b) m$^2$×60 seconds/10 seconds= 6(8a+9b) m$^2$.

Suppose the water sprinkled area is 3 times (8a+9b) m$^2$ for paralyzing a length of burning objects of 20 m (i.e. 20 m=0.833 assumed multiplier×8 diffuser outlets×3 m separation between each diffuser outlet), then the length of fire front that can be paralyzed by one action of discharging 480 liters of water from the airborne water container via the invented system is 20 m×2=40 m, within a time span of 1 minute. Note that 2=6(8a+9b)/3(8a+9b).

Suppose the fire front is 2 km (i.e. 2,000 m), it will then take 50 such operations to paralyze this fire front, because 2,000 m/40 m=50.

If it takes 2 minutes for the two helicopters to travel from the fire front to a water source to refill the airborne water container with effective water capacity of 480 liters and then travels back to the fire front, then the two helicopters will have to conduct 50 such operations in an overall time period of about 150 minutes (i.e. 150 minutes=50×(2+1) minutes) for paralyzing a fire front of 2,000 m long.

Now suppose a larger airborne water container that can discharge water of 960 liters is used, then each helicopter operation will take about 4 minutes (i.e. 4 minutes=2 minutes of traveling and filling water+2 minutes of discharging water) and paralyze 80 m long fire front. In order to paralyze 2,000 m long fire front, it will take 25 helicopter operations (i.e. 2,000 m/80 m=25). Then it will take 100 minutes (i.e. 100 minutes=4 minutes per operation×25 operations) to paralyze a fire front of 2000 m long.

Thus such airborne water sprinkler systems operated by two helicopters can be more time effective in fighting forest fires by using larger water containers and related helicopters of larger capacity.

In the scenario above, water loss to air depends on the distribution of water drop sizes discharged, air down draft from helicopter, wind direction, fire gas upward movement. Therefore assumed loss of 2 liters/m$^2$/minute may vary.

The arrangement of eight diffuser outlets is one way of arranging the diffuser outlets. There are other possible ways of diffuser outlet arrangement for varying the number of diffuser outlets, distance between diffuser outlets and their lengths, and lengths of flexible tubes.

If there are additional helicopters fighting the fire from both ends of the length of burning objects, using the invented systems the same fire can be paralyzed in a shorter time.

The invention has been described with reference to preferred embodiments. Those skilled in the art will perceive improvements, changes and modifications. Such improvements, changes and modifications are intended to be within the scope of the claims.

What is claimed is:

1. An apparatus for use with a container of liquid that is suspended from an aircraft flying over a ground target area, the container having an outlet through which the liquid is dropped from the container, said apparatus comprising:

a diffuser configured to diffuse the liquid exiting the container outlet horizontally outward beyond the container into the air above the ground target area, whereby the liquid is diffused over a wide area;

said diffuser having a diffuser inlet for receiving the liquid and diffuser outlets for discharging the liquid into the air, said diffuser outlets being spaced horizontally from each other;

said diffuser comprising a manifold communicating said diffuser inlet with said diffuser outlets;

said manifold having rigid hydraulic lines extending from said diffuser inlet, and also having flexible hydraulic lines extending from said rigid lines to said diffuser outlets; and buoyant structures configured to maintain said diffuser outlets above the container when the container is submerged in a body of liquid.

2. An apparatus comprising:

a container configured to be suspended from an aircraft flying over a ground target area, said container having a container outlet and being vented to enable liquid contents of said container to exit said container through said container outlet by the force of only gravity; and a diffuser configured to diffuse liquid, by the force of gravity, from said container outlet into air above the ground target area throughout a circular area extending horizontally outward beyond said container;

wherein said diffuser includes a diffuser inlet, a plurality of diffuser outlets, and a manifold communicating said diffuser inlet with said diffuser outlets, said manifold having rigid hydraulic lines extending radially outward from said diffuser inlet, and also having flexible hydraulic lines extending from said rigid hydraulic lines to said diffuser outlets to suspend said diffuser outlets from said rigid hydraulic lines under the force of gravity.

3. An apparatus for use with a container of liquid that is suspended from an aircraft flying over a ground target area, the container having an outlet through which the liquid can exit the container, said apparatus comprising:

a diffuser configured to diffuse the liquid exiting the container outlet horizontally outward beyond the container into air above the ground target area, said diffuser having a diffuser inlet for receiving the liquid from the container outlet, diffuser outlets for discharging the liquid into the air, and a manifold communicating said diffuser inlet with said outlets, with said manifold supporting said diffuser outlets at locations that are spaced horizontally outward and vertically downward from said diffuser inlet so as to diffuse the liquid by the force of only gravity;

said manifold having rigid hydraulic lines extending from said diffuser inlet, and also having flexible hydraulic lines extending from said rigid lines to said diffuser outlets to suspend said diffuser outlets from said rigid hydraulic lines under the force of gravity.

* * * * *